United States Patent
Sakamoto

(10) Patent No.: US 7,972,234 B2
(45) Date of Patent: Jul. 5, 2011

(54) SILENT CHAIN

(75) Inventor: Naoji Sakamoto, Nabari (JP)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 12/769,949

(22) Filed: Apr. 29, 2010

(65) Prior Publication Data

US 2010/0216582 A1  Aug. 26, 2010

Related U.S. Application Data

(62) Division of application No. 12/477,242, filed on Jun. 3, 2009, and a division of application No. 11/535,556, filed on Sep. 27, 2006, now abandoned.

(30) Foreign Application Priority Data

Sep. 28, 2005  (JP) .................................. 2005-281751

(51) Int. Cl.
  *F16G 13/04* (2006.01)
(52) U.S. Cl. ........................................ 474/213; 474/212
(58) Field of Classification Search ........... 474/211–215
  See application file for complete search history.

(56) References Cited

U.S. PATENT DOCUMENTS

| 6,260,345 | B1 | 7/2001 | Kanehira et al. | |
| 6,432,011 | B1 | 8/2002 | Kanehira et al. | |
| 2001/0019976 | A1* | 9/2001 | Wakabayashi | 474/214 |
| 2002/0049107 | A1* | 4/2002 | Ledvina | 474/213 |
| 2002/0061800 | A1* | 5/2002 | Saito | 474/212 |
| 2002/0072444 | A1 | 6/2002 | Matsuno et al. | |
| 2002/0169046 | A1* | 11/2002 | Sakamoto et al. | 474/212 |
| 2002/0173393 | A1 | 11/2002 | Skurka et al. | |
| 2003/0045388 | A1 | 3/2003 | Kotera | |
| 2004/0166978 | A1 | 8/2004 | Matsuda et al. | |
| 2004/0176201 | A1* | 9/2004 | Mott et al. | 474/215 |
| 2006/0079361 | A1 | 4/2006 | Ueda et al. | |
| 2006/0276286 | A1* | 12/2006 | Mott et al. | 474/156 |
| 2009/0048047 | A1 | 2/2009 | Nagae et al. | |

FOREIGN PATENT DOCUMENTS

| JP | 63-219940 | 9/1988 |
| WO | 2007077616 | 7/2007 |

* cited by examiner

*Primary Examiner* — Michael R Mansen
*Assistant Examiner* — Robert T Reese
(74) *Attorney, Agent, or Firm* — Brown & Michaels, PC

(57) ABSTRACT

String vibration is reduced without causing friction loss. A silent chain is comprised of a multiple number of link plates, each of which has a pair of tooth portions and pin holes and which are laminated laterally and longitudinally and guide plates which are arranged at outermost positions of the link plates. The link plates and the guide plates are connected by connecting pins. In this construction, some of the guide plates are made heavier than that of other guide plates and are irregularly mixed in a longitudinal direction of the chain. Thus, the natural frequency can be changed in an arbitrary chain span and string vibration may be reduced without causing friction loss.

1 Claim, 4 Drawing Sheets

SILENT CHAIN

REFERENCE TO RELATED APPLICATIONS

This is a divisional patent application of co-pending U.S. application Ser. No. 12/477,242, filed on Jun. 3, 2009, entitled "SILENT CHAIN" which is a divisional patent application of U.S. application Ser. No. 11/535,556, filed on Sep. 27, 2006, entitled, "SILENT CHAIN", which claimed one or more inventions which were disclosed in Japanese application number 2005-281751, filed Sep. 28, 2005, entitled "SILENT CHAIN". The benefit under 35 USC§119(a) of the Japanese application is hereby claimed, and the aforementioned applications is are hereby incorporated herein by reference.

BACKGROUND OF THE INVENTION

1. Field of the Invention

The present invention relates to a silent chain in which multiple link plates each having a pair of teeth and pin apertures are interleaved in the longitudinal and lateral directions and interconnected to each other by the connecting pins, and more particularly, to an improvement of the structure of the silent chain to decrease the chordal oscillation.

2. Description of Related Art

Silent chains are used as timing chains for automobiles, motorcycles, and the like. A silent chain is typically comprised of multiple link plates each having a pair of teeth and pin apertures and pivotably connected to each other by the connecting pins inserted into the pin apertures.

During operation of the silent chain, chordal oscillation that generates in the chain span between the driving and driven sprockets is one of the causes of noise occurrences. Therefore, various efforts have been made to reduce such chordal oscillation.

Japanese patent application laying-open publication No. 63-219940 shows a silent chain with two types of leaf springs of different spring rates that are inserted between the adjacent link plates of the guide rows and that are randomly disposed in the longitudinal direction.

In this case, biasing forces generated by the leaf springs and acting between the adjacent link plates in the lateral direction vary randomly in the longitudinal direction. Thereby, bending resistance of the chain span between the driving sprocket and the driven sprocket vary successively. As a result, eigenfrequency of the chain span vary successively and chordal oscillation of the chain span can be decreased.

However, in the prior art silent chain, the biasing forces by the leaf springs act between the adjacent link plates at all times during operation. Therefore, there is a disadvantage that it has a considerable friction loss during operation which causes a decrease in power transmission efficiency of the chain.

The present invention is directed to providing a silent chain that can decrease the chordal oscillation without causing the frictional loss.

SUMMARY OF THE INVENTION

A silent chain according to one aspect of the present invention includes a plurality of link plates pivotably connected to each other via connecting pins and a plurality of guide plates. The guide plates are formed of at least two types of guide plates of different weight that are disposed at a random pattern in the longitudinal direction.

According to the first aspect of the present invention, since at least two types of guide plates of different weight are disposed at a random pattern in the longitudinal direction, the weight of the chain span between the drive and driven sprockets varies successively during operation and eigenfrequency of the chain span thus varies successively. Thereby, occurrence of the resonance can be restrained and chordal oscillation of the chain span can be decreased. In this case, since only the weight of the guide plates needs to be changed a decrease in the chordal oscillation can be achieved without causing frictional loss. The weight of the guide plates may be made different by altering at least one of the geometric configurations, thicknesses, and materials. Also, the geometric configurations of the guide plates may be made different by altering the shapes of the backside surfaces.

A silent chain according to a second aspect of the present invention includes a plurality of link plates pivotably connected to each other via connecting pins. The link plates are formed of at least two types of link plates of different weight that are disposed at a random pattern in the longitudinal direction.

According to the second aspect of the present invention, since at least two types of link plates of different weight are disposed at a random pattern in the longitudinal direction, the weight of the chain span between the drive and driven sprockets varies successively during operation and eigenfrequency of the chain span thus varies successively. Thereby, occurrence of the resonance can be restrained and chordal oscillation of the chain span can be decreased. In this case, since only the weight of the link plates needs to be changed a decrease in the chordal oscillation can be achieved without causing frictional loss.

The weight of the link plates may be made different by altering at least one of the geometric configurations, thicknesses, and materials. Also, the geometric configurations of the link plates may be made different by altering the shapes of the backside surfaces. A silent chain according to a third aspect of the present invention includes a plurality of link plates pivotably connected to each other via connecting pins. The connecting pins are formed of at least two types of connecting pins of different weight that are disposed at a random pattern in the longitudinal direction.

According to the third aspect of the present invention, since at least two types of connecting pins of different weight are disposed at a random pattern in the longitudinal direction, the weight of the chain span between the drive and driven sprockets varies successively during operation and eigenfrequency of the chain span thus varies successively. Thereby, occurrence of the resonance can be restrained and chordal oscillation of the chain span can be decreased. In this case, since only the weight of the connecting pins needs to be changed a decrease in the chordal oscillation can be achieved without causing frictional loss.

The weight of the connecting pins may be made different by altering at least one of the cross sectional shapes, diameters, lengths and materials.

A silent chain according to a fourth aspect of the present invention includes a plurality of link plates pivotably connected to each other via connecting pins. At the ends of the connecting pins are fixedly attached washers. The washers are disposed at a random pattern in the longitudinal direction.

According to the fourth aspect of the present invention, since the washers are disposed at a random pattern in the longitudinal direction, the weight of the chain span between the drive and driven sprockets varies successively during operation and eigenfrequency of the chain span thus varies successively. Thereby, occurrence of the resonance can be restrained and chordal oscillation of the chain span can be decreased. In this case, since only the arrangement of the washers needs to be changed a decrease in the chordal oscillation can be achieved without causing frictional loss.

DETAILED DESCRIPTION OF THE INVENTION

Figure 1:
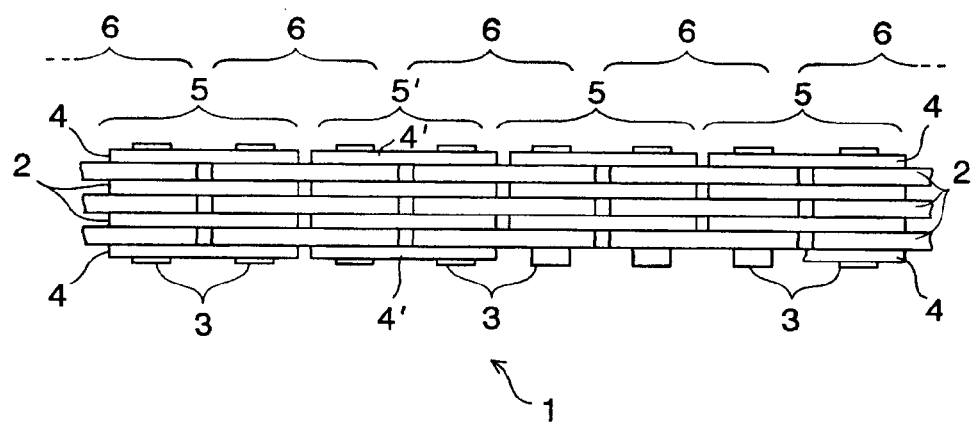
FIG. 1 is a top plan view of a portion of a silent chain according to a first embodiment of the present invention.
Figure 2:
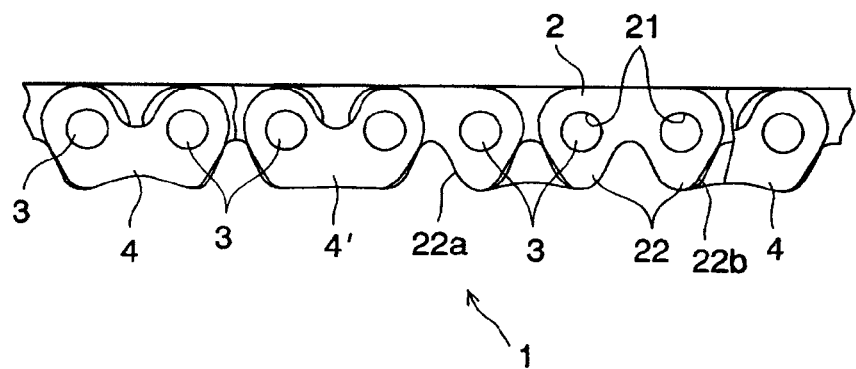
FIG. 2 is a front elevational view of the silent chain of FIG. 1.

FIGS. 1 to 4 illustrate a first embodiment of the present invention. As shown in FIGS. 1 and 2, a silent chain 1 is composed of a plurality of link plates 2 interleaved in the lateral and longitudinal directions and pivotably connected by connecting pins 3 and a plurality of first and second guide plates 4, 4' disposed on the outermost sides of the silent chain 1.

The silent chain 1 is also composed of a plurality of guide rows 5 that are formed of the first guide plates 4 and the link plates 2 disposed at the same longitudinal position as the first guide plate 4, a plurality of guide rows 5' that are formed of the second guide plates 4' and the link plates 2 disposed at the same longitudinal position as the second guide plate 4', and a plurality of link rows 6 that are formed of only the link plates 2 and that are disposed between the adjacent guide rows 5, 5'. The guide rows 5, 5' and the link rows 6 are arranged alternately in the longitudinal direction. Also, the first and second guide plates 4, 4' are disposed at a random or irregular pattern in the longitudinal direction.

The link plate 2 has a pair of pin apertures 21 and a pair of teeth 22. A connecting pin 3 is inserted into each of the pin apertures 21. Each of the teeth 22 is formed of an inside flank 22a and an outside flank 22b that engage with sprocket teeth (not shown).

Figure 3:
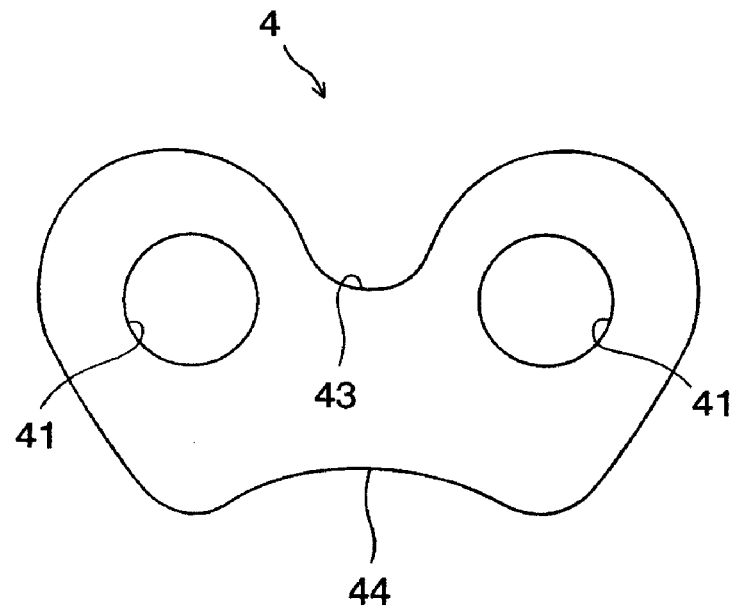
FIG. 3 is an enlarged front elevational view of a first guide plate that constitutes the silent chain of FIG. 1.

As shown in FIG. 3, the first guide plate 4 has a pair of pin apertures 41, a crotch portion 43, and a backside surface 44. An end of the connecting pin 3 is inserted into each of the pin apertures 41 and fixedly attached thereto. The crotch portion 43 preferably extends below the upper edge portion of each of the pin apertures 41. The backside surface 44 is concave in shape.

Figure 4:
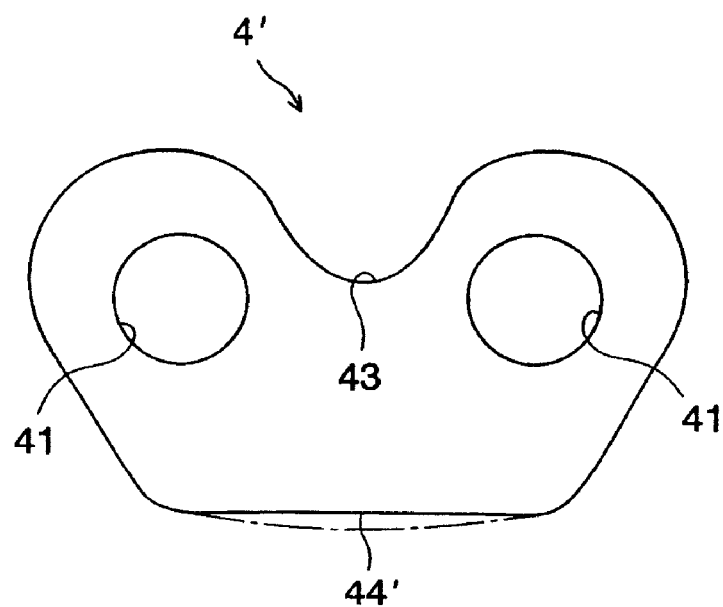
FIG. 4 is an enlarged front elevational view of a second guide plate that constitutes the silent chain of FIG. 1.

As shown in FIG. 4, the second guide plate 4' has a pair of pin apertures 41, a crotch portion 43, and a backside surface 44'. As with the first guide plate 4, an end of the connecting pin 3 is inserted into each of the pin apertures 41 and fixedly attached thereto, and the crotch portion 43 extends below the upper edge portion of each of the pin apertures 41. The backside surface 44' is flat in shape. Alternatively, the backside surface 44' may be convex in shape as shown in a dash-and-dot-line.

Therefore, in this case, the guide plate 4' is heavier than the guide plate 4 and these guide plates 4, 4' are arranged at a random or irregular pattern in the longitudinal direction.

In such a manner, by arranging two types of the guide plates 4, 4' of different weight at a random pattern in the longitudinal direction, the weight of the chain span between the drive and driven sprockets varies successively during operation and eigenfrequency of the chain span thus varies successively. Thereby, occurrence of the resonance can be restrained and chordal oscillation of the chain span can be decreased. In this case, since only the weight of the guide plates needs to be changed a decrease in the chordal oscillation can be achieved without causing frictional loss.

Figure 5:
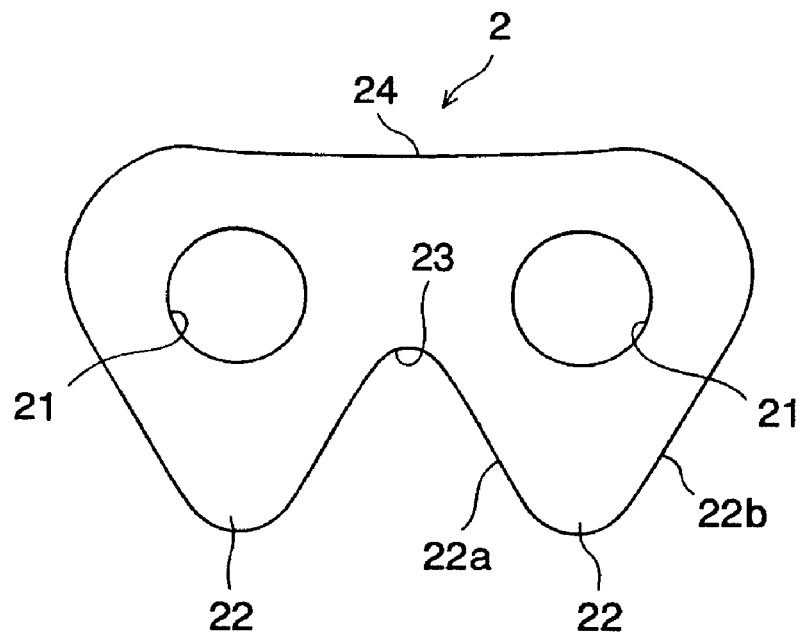
FIG. 5 is an enlarged front elevational view of a first link plate that constitutes a silent chain according to a second embodiment of the present invention.
Figure 6:
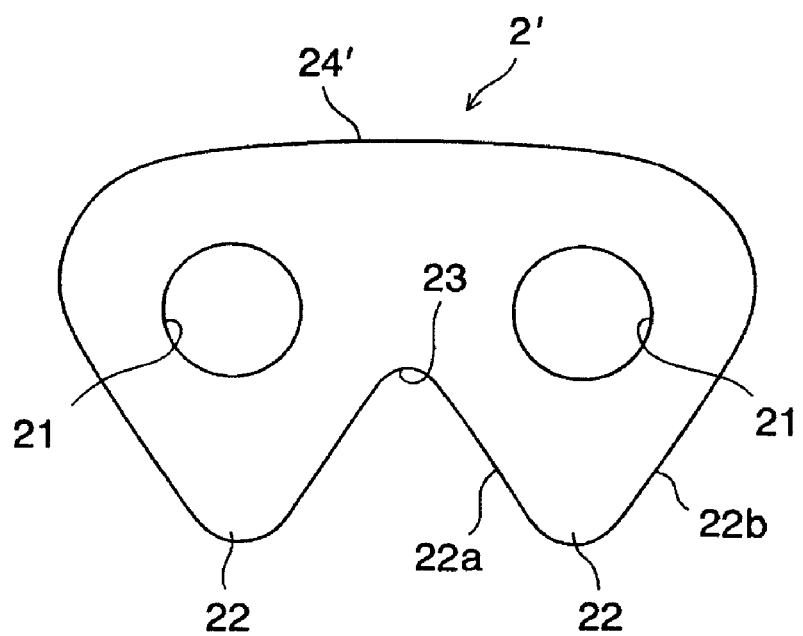
FIG. 6 is an enlarged front elevational view of a second link plate that constitutes the silent chain according to the second embodiment of the present invention.

FIGS. 5 and 6 illustrate a second embodiment of the present invention. In these drawings, like reference numbers indicate identical or functionally similar elements.

In the above-mentioned first embodiment, the weight of the guide plates varies at a random pattern in the longitudinal direction by differentiating the shapes of the backside surfaces of the guide plates, but in the second embodiment, the weight of the link rows or guide rows varies at a random pattern in the longitudinal direction by differentiating the shapes of the backside surfaces of the link plates.

The backside surface 24 of the first link plate 2 is concave in shape as shown in FIG. 5, whereas the backside surface 24' of the second link plate 2' is convex in shape as shown in FIG. 6.

Therefore, in this case, the link plate 24' is heavier than the link plate 24 and the link rows or guide rows formed of these link plates 24, 24' are arranged at a random or irregular pattern in the longitudinal direction.

In such a manner, by arranging the link rows or guide rows formed of two types of the link plates 24, 24' of different weight at a random pattern in the longitudinal direction, the weight of the chain span between the drive and driven sprockets varies successively during operation and eigenfrequency of the chain span thus varies successively. Thereby, occurrence of the resonance can be restrained and chordal oscillation of the chain span can be decreased. In this case, since only the weight of the link plates needs to be changed a decrease in the chordal oscillation can be achieved without causing frictional loss.

In the above-mentioned first and second embodiments, the shapes of the backside surfaces of the guide plates or the link plates are made different in the longitudinal direction, but in a third embodiment (not shown), the weight of the connecting pins are made different in the longitudinal direction.

The weight of the connecting pins is made different by altering one of the cross sectional shapes, diameters, lengths and materials.

In such a manner, by arranging two types of connecting pins of different weight at a random pattern in the longitudinal direction, the weight of the chain span between the drive and driven sprockets varies successively during operation and eigenfrequency of the chain span thus varies successively. Thereby, occurrence of the resonance can be restrained and chordal oscillation of the chain span can be decreased. In this case, since only the weight of the connecting pins needs to be changed a decrease in the chordal oscillation can be achieved without causing frictional loss.

Figure 7:
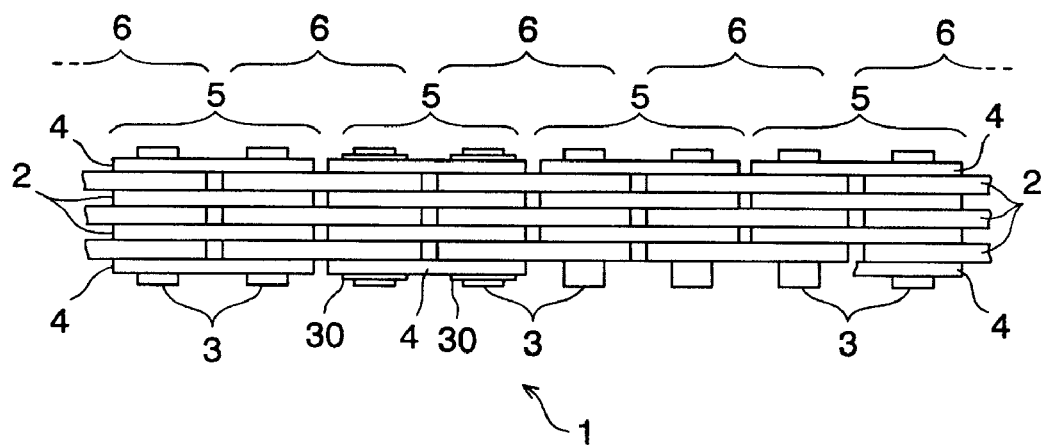
FIG. 7 is a top plan view of a portion of a silent chain according to a fourth embodiment of the present invention.
Figure 8:
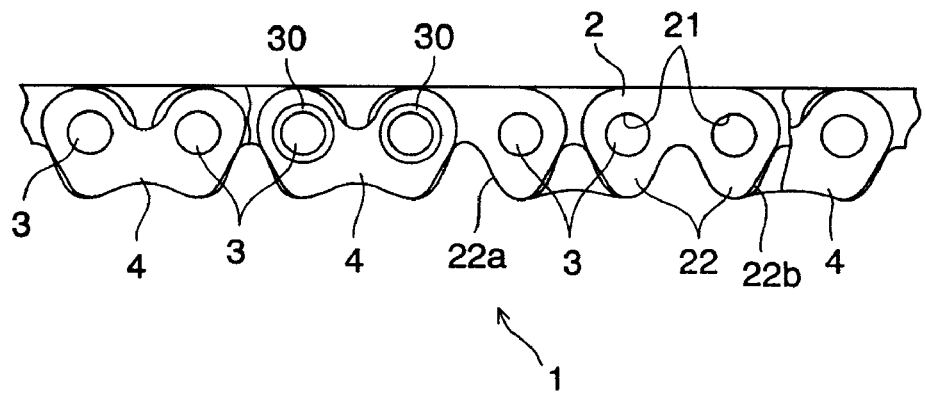
FIG. 8 is a front elevational view of the silent chain of FIG. 7.

FIGS. 7 and 8 illustrate a fourth embodiment of the present invention. In these drawings, like reference numbers indicate identical or functionally similar elements.

In the fourth embodiment, washers 30 are fixedly attached to the ends of the connecting pins 3. The locations of the washers 30 are arranged at a random pattern in the longitudinal direction.

In this case as well, the weight of the chain span between the drive and driven sprockets varies successively during operation and eigenfrequency of the chain span thus varies successively. Thereby, occurrence of the resonance can be restrained and chordal oscillation of the chain span can be decreased.

In the above-mentioned first to third embodiments, two types of guide plates, link plates, or connecting pins of different weight were used, but the present invention can be applied to the case in which three type s or more of guide plates, link plates, or connecting pins of different weight are used.

In the above-mentioned first to third embodiments, the guide plates only, link plates only, or the connecting pins only are made different in the longitudinal direction, but any two or more of them may be made different in the longitudinal direction.

In the above-mentioned first and second embodiments, the shapes of the backside surfaces of the guide plates or the link plates were made different in order to differentiate the weight of the guide plates or the link plates, but the shapes of the other portions of the guide plates or the link plates may be made different. Alternatively, the thicknesses or materials of the guide plates or the link plates other than the plane shape may be made different in order to differentiate the weight of the guide plates or the link plates. In the alternative, some of the different shapes, thicknesses, or materials may be combined with each other.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A silent chain comprising a plurality of link plates, each of the link plates having a pair of teeth and a pair of apertures for receiving connecting pins, the plurality of link plates arranged laterally and longitudinally in rows and pivotably connected together by connecting pins inserted into the pair of apertures; guide plates disposed on the outermost sides of the link plates and fixedly attached to the connecting pins; and a plurality of washers fixed to ends of the connecting pins wherein the washers are irregularly positioned in a longitudinal direction of the chain.

* * * * *